May 19, 1942.  W. MIKELSON  2,283,750
APPARATUS FOR MEASURING THE DENSITY OF GASES
Filed Jan. 16, 1940
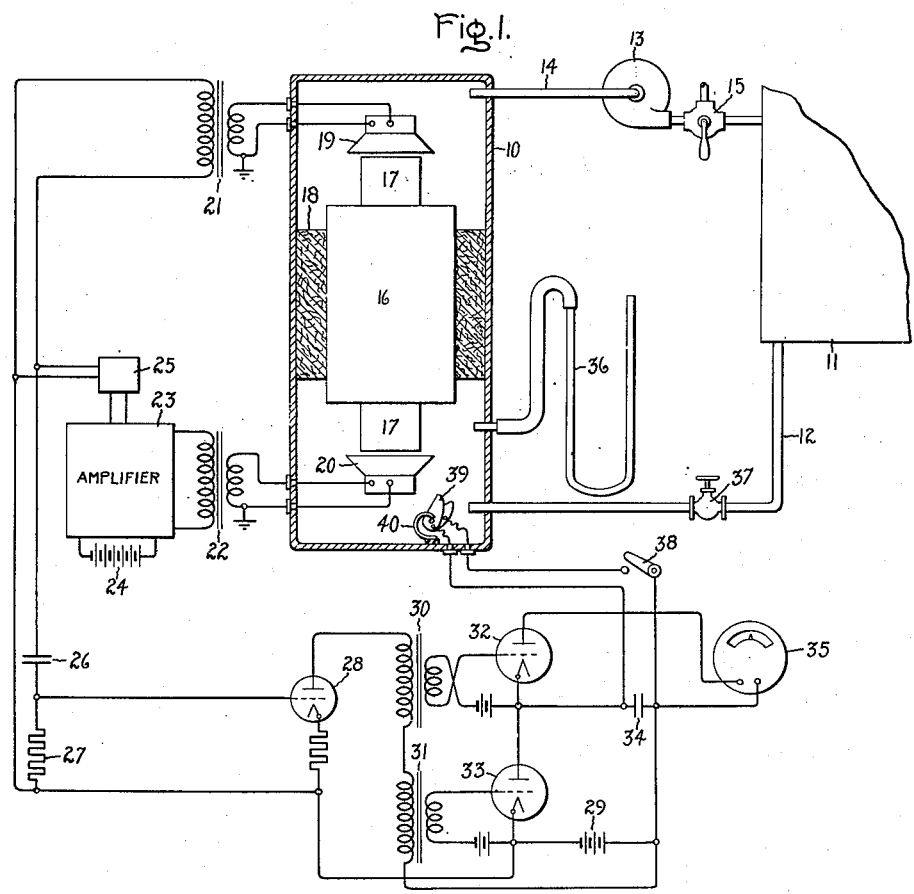
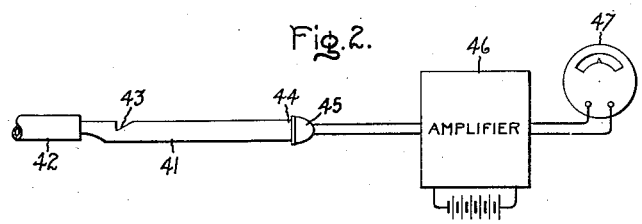
Inventor:
Walter Mikelson,
by Harry E. Dunham
His Attorney.

Patented May 19, 1942

2,283,750

UNITED STATES PATENT OFFICE 2,283,750

APPARATUS FOR MEASURING THE DENSITY OF GASES

Walter Mikelson, Schenectady, N. Y., assignor to General Electric Company, a corporation of New York Application January 16, 1940, Serial No. 314,074

2 Claims. (Cl. 73—51)

My invention relates to apparatus for measuring the density of gases and for measuring the percentage of a given gas in certain gaseous mixtures.

In carrying my invention into effect I make use of the principle that the rate of travel of sound through a gas is inversely proportional to the gas density. I prefer to employ apparatus for transmitting sound a constant distance through a sample of the gas to be studied. A sound pick-up device is used which is coupled with the sound transmitter through a regenerative feed-back circuit. As thus arranged I have found that the system will oscillate at a frequency which varies with the density of the gas through which the sound is transmitted, and that this frequency can then be measured in terms of gas density or gas purity. For gas purity measurements, temperature compensation may be necessary where the temperature of the gas mixture varies materially.

The features of my invention which are believed to be novel and patentable will be pointed out in the claims appended hereto. For a better understanding of my invention reference is made in the following description to the accompanying drawing illustrating in Fig. 1 preferred apparatus for carrying my invention into effect and in Fig. 2 a simple form of my invention in which a whistle blown by the gas to be investigated constitutes the sound source.

In Fig. 1, 10 represents a closed gas testing receptacle into which a sample of the gas to be tested is drawn or circulated. For example, the tank represented at 11 may be a gas tank and a sample of the gas therein may be drawn into receptacle 10 through pipe 12, by means of the pump represented at 13. The pump 13 may be in a return conduit 14 so as to continuously circulate the gas to be tested through the testing container 10. The conduits may contain valves such as represented at 15 for convenience in the use of the apparatus. The valve at 15 permits the gas delivered from the pump 13 to be exhausted to the atmosphere or returned to tank 11 as desired. The test vessel 10 contains a hollow resonator 16 having reduced end sections 17. This resonator is cylindrical in shape and is hollow and the opposite ends are open. I have used a resonator four inches in maximum diameter with proportions represented in Fig. 1 with satisfactory results. This resonator is preferably supported from the interior walls of vessel 10 by a sound deadening material such as felt at 18 to reduce sound travel about the exterior of the resonator from one end to the other. Opposite one open end of the resonator is an electric sound transmitter 19 and opposite the other open end of the transmitter is an electric sound pick-up device 20. The devices 19 and 20 are, in general, similar to telephone transmitters and receivers. As thus arranged, sound vibrations transmitted from device 19 will be transmitted through the resonator and be picked up by receiver 20 with good efficiency. The transmitter 19 and receiver 20 are connected together through a suitable regenerative feed-back circuit including transformers 21 and 22 and an amplifier system represented by the box at 23. 24 represents a suitable source of supply for the amplifier and system. The transformer 22 is connected in the input circuit to the amplifier and the transformer 21 in the output circuit of the amplifier. A phase shifter indicated at 25 will generally be included in the output leads of the amplifier to assist, where necessary, in obtaining an oscillating phase relationship between the transmitter and the pick-up device of the oscillation circuit. The details of the amplifier are subject to variation and are well-known and it is believed no detail discussion thereof is necessary. Likewise this type of regenerative feed-back system is well-known. A simple example of the operation of such a system is the vibration howl that occurs when the receiver and transmitter of a telephone are held in close sound-transmitting relation.

I have discovered that the frequency at which such a system oscillates, for a given resonator 16, varies with the density of the gas in the resonator 16 between the transmitter 19 and receiver 20 and that the measurement of such frequency after calibration of the device gives reliable and accurate density measurements. The gas within the main large portion of the resonator apparently acts somewhat like a spring in mechanically transmitting pressure impulses corresponding to the sound impulses between the gas in the neck portions 17 thereof. Changes in the design of the resonator will change the frequency of the oscillating system for a constant density gas, but I provide an efficient resonator of fixed resonating or vibration characteristics and utilize the apparatus for measuring gas density. For example, the apparatus described will produce one frequency at the output terminals of the amplifier when air is contained in the resonator and it will produce a frequency 3.81 times higher when pure hydrogen is contained in the resonator. The lower frequency for air is about 400 cycles per second and the higher frequency for pure hydrogen is the lower frequency times 3.81 or about 1500 cycles. I am not particularly interested in what these frequencies are but only in their calibrated relationship which is indirectly proportional to gas density. This relationship is the same as that between the rate of travel of sound in the respective gases. Thus $$\frac{Vh}{Va} = 3.81$$

where $Vh$ represents the velocity of sound in pure hydrogen and $Va$ the velocity of sound in air at the same pressure and temperature. The measurement of the frequency in suitable terms may be carried out with any suitable type of frequency meter. One frequency metering equipment which I have used successfully is illustrated in Fig. 1 and is described as follows:

Connected across the output circuit of the amplifier 23, either ahead or behind the phase shifter 25, if used, is a condenser 26 and resistance 27 serving as a coupling to impress a voltage of the frequency to be investigated across the grid and cathode of a tube 28. The primary purpose of tube 28 is to transmit the frequency at constant voltage and tube 28 will have a constant voltage output characteristic. The output circuit of tube 28 is supplied by the battery at 29 and includes the primaries of transformers 30 and 31. The secondaries of transformers 30 and 31 are in the input circuits of rectifier tubes 32 and 33 but the connections are reversed so that the tubes are energized with a 180 degree difference in phase relation, hence tube 32 is conducting when tube 33 is non-conducting and vice versa. The output circuit of tube 33 includes a condenser 34 and a direct current instrument 35. It is seen now that condenser 34 will be charged through tube 33 during one-half of a cycle and discharged through tube 32 and meter 35 the next half-cycle. Instrument 35 thus measures the discharge current of the condenser. Since this discharge current per cycle is constant, the current flow through meter 35 in a given small length of time will be proportional to the frequency. Hence meter 35 is suitably damped and produces a deflection proportional to frequency and hence its scale calibration may be in terms of density of the gas in the test container 10.

The density of a given kind of gas increases with pressure rise and decreases with temperature rise, and in cases where the pressure and temperature are likely to vary materially and it is desired to determine the density under standard pressure and temperature conditions, these conditions must be controlled or their effect compensated for. At 36 I have shown a manometer for measuring the pressure in container 10 and at 37 a check valve in supply conduit 12 by means of which a desired gas pressure in container 10 may be obtained.

Connected in parallel with condenser 34 through a switch 38 I have shown a variable condenser 39 controlled by a bimetallic thermal spiral 40 in container 10. When the temperature of the gas varies materially the switch 38 may be closed so that the capacitance which feeds current to meter 35 may be varied to compensate for any error that otherwise might exist in the measurement due to temperature variations of the gas in container 10. The device 40 is arranged to decrease the capacitance with a rise in temperature to the extent necessary to offset the increase in frequency which is due to such temperature rise. Thus the device 40—39 is arranged to maintain the current through 35 constant for those variations in frequency which are due to temperature variations of the gas so that meter 35 correctly indicates gas density at a certain temperature.

The value of capacity of condenser 34 may be selected for correct results with a given selected gas temperature. When the gas being investigated is at such temperature the switch 38 may be left open. For lower temperatures the small variable condenser 39 may be switched in parallel with condenser 34 and the thermal element 40 will be adjusted to vary condenser 39 for correct compensation. The density reading obtained will then be the density of the gas at the given selected temperature. Of course, if it is desired to measure gas density at the existing temperature and pressure, whatever it may be, switch 38 will be left open and the reading will be actual density under the existing conditions.

The percentage of one gas in a two-gas mixture may be determined by this apparatus. For example, it was pointed out above that the density reading for pure hydrogen was 3.81 times higher than for air. Now, suppose the tank 11 represents a portion of a hydrogen cooling system for electrical apparatus, such for example, as is described in United States Patent No. 1,453,083, April 24, 1923, Schuler.

If the hydrogen becomes mixed with air, knowledge of this fact is desirable and also it is desirable to know the extent of such mixing or the purity of the hydrogen.

Hydrogen purity in mixtures of hydrogen and air may be determined as follows: Assume that air produces a frequency of 400 cycles and pure hydrogen a frequency of 1500 cycles, then a mixture of the two gases will produce an intermediate frequency proportional to hydrogen purity. If the mixture produces a frequency of 1200 cycles, the hydrogen purity X expressed in per cent of hydrogen is obtained as follows:

$$\frac{1200-400}{1500-400} = \frac{X}{100}$$

$$\frac{800}{1100} = \frac{X}{100}$$

$$X = 72.73$$

It is evident that the scale of the meter 35 may be calibrated directly in hydrogen purity if that is desired.

In the same manner the percentage of a particular gas in any mixture of two gases of different densities may be determined.

Fig. 2 represents a simple and less sensitive form of my invention. In this figure, 41 represents an ordinary whistle. The whistle is blown by using the gas to be investigated. Such gas is piped to the whistle by the tube represented at 42. The hollow body of the whistle between the whistle notch 43 and the end 44 comprises a resonator and the end at 44 is closed by a suitable sound receiver 45 in the nature of a telephone receiver. The receiver is connected through a suitable amplifying apparatus 46 to frequency measuring apparatus represented at 47.

In the use of this device it will be desirable to momentarily remove receiver 45 from the end 44 of the whistle while gas is being blown therein to be sure that the resonator is filled with the gas to be investigated before taking a test reading. The gas pressure at which the whistle is blown should always be the same or approximately the same as that used in calibration. The frequency of the sound vibrations received at 44 is inversely proportional to the density of the gas in the resonator through which the sound of the whistle travels from the notch 43 to the pick-up 45. This device omits the regenerative feed-back of Fig. 1 but uses a whistle as the sound source.

What I claim as new and desire to secure by Letters Patent of the United States is:

1. Gas density measuring apparatus comprising a hollow cylindrical resonator open at its two ends, electromagnetic sound transmitting and sound receiving devices located at the end openings of the resonator for the purpose of communicating sound waves between them through said resonator, facilities for filling said resonator with the gas to be investigated, a regenerative feed-back oscillation circuit including an amplifier connected between said sound transmitting and sound receiving devices, said circuit being conditioned so as to be free to oscillate at a frequency which is determined by the density of the gas in said oscillator, frequency measuring apparatus connected to measure the frequency of said oscillation circuit, a variable impedance associated with the connections to said frequency meter and means responsive to the temperature of the gas in said resonator for varying said impedance in a direction and to the extent necessary to compensate said frequency measuring apparatus for such variations in the frequency of said oscillation circuit as are due to changes in the temperature of the gas in the resonator.

2. Gas density measuring apparatus comprising a hollow cylindrical resonator of fixed dimensions having openings at its two ends, electromagnetic transmitting and receiving microphones located a fixed distance apart in the openings of said resonator with their sound openings facing each other through said resonator, means for filling the resonator with the gas to be investigated so that the gas becomes the sound transmitting medium between said microphones, a regenerative feed-back oscillation circuit electrically connected between said microphones such that the circuit is self-oscillating at a frequency inversely proportional to the density of the gas in said oscillator, a three electrode vacuum tube having its input circuit coupled to said oscillation circuit, alternating current transformer means fed by the output circuit of said tube, said tube having a constant voltage output, a pair of rectifier vacuum tubes having their input circuits fed in 180 degree phase relation from said transformer means, whereby one is conducting when the other is non-conducting and vice versa, a condenser connected to the output circuits of said rectifier tubes so that the condenser is charged through one rectifier tube and discharged through the other rectifier tube, and a direct current instrument connected to measure the average current flow through said condenser in terms of the gas density in said resonator.

WALTER MIKELSON.